Frank G. Boucher Inventor
By W. O. ~~Heilman~~ Attorney

Frank G. Boucher Inventor

Frank G. Boucher Inventor

June 2, 1953　　　F. G. BOUCHER　　　2,640,275
ORIENTED DIP AND STRIKE INDICATOR FOR BOREHOLES
Filed April 29, 1949　　　　　　　　　　9 Sheets-Sheet 6

Frank G. Boucher Inventor
By W. O. T Heilman Attorney

June 2, 1953 — F. G. BOUCHER — 2,640,275
ORIENTED DIP AND STRIKE INDICATOR FOR BOREHOLES
Filed April 29, 1949 — 9 Sheets-Sheet 7

Frank G. Boucher Inventor
By W. O. J. Heilman Attorney

Patented June 2, 1953

2,640,275

UNITED STATES PATENT OFFICE 2,640,275

ORIENTED DIP AND STRIKE INDICATOR FOR BOREHOLES

Frank G. Boucher, Tulsa, Okla., assignor to Standard Oil Development Company, a corporation of Delaware Application April 29, 1949, Serial No. 90,324

4 Claims. (Cl. 33—205.5)

The present invention is directed to a new and improved apparatus for logging bore holes in the earth. More particularly the invention relates to apparatus for determining the dip and strike of earth strata that have been traversed by a bore hole. This application is a continuation-in-part of copending application Serial No. 23,490 filed April 27, 1948.

In the constant search for new sources of crude oil many means have been devised for determining whether any possibility of obtaining oil from a particular locality exists but all methods involve a considerable expenditure of time and effort and it is therefore desirable to obtain every bit of information that is available when an area is being explored. One valuable source of information regarding the geological structure of a particular area is the bore hole obtained when an oil well is being drilled. Not only is the material removed during drilling examined closely but the well bore itself is usually subjected to intensive examination to determine the nature and position of the various strata encountered. The numerous methods employed in such examination are referred to broadly as well logging methods. It is one of the objects of the present invention to provide a novel form of apparatus for well logging, particularly for determining the dip and strike of strata traversed by a bore hole.

The dip of a stratum is defined as the angle formed by the plane of the stratum and a horizontal plane, and the strike of a stratum as the direction, with respect to the compass, of the line formed by the intersection of the plane of stratification with a horizontal plane. The orientation of a stratum in terms of dip and strike is of considerable value in establishing the general geologic nature of the earth in the area being studied and is useful in predicting the existence of oil deposits and their possible extent.

A basic principle upon which the operation of the apparatus of the present invention depends is that the diameter of a bore hole will vary more or less in proportion to the nature of the various strata encountered. In general this results from the fact that preferential erosion of the various types of strata occurs as the hole is drilled, due to the fact that the different types of sedimentary rocks vary in brittleness and in the eroding effect of the drilling mud on them. Thus, for example, it is known that a shale stratum will give a wider hole than an adjacent sandstone or limestone when drilling a hole of a given size and that if such a hole is traversed with a profiling instrument, the recorded profile will show good definition between two different types of strata, particularly between a shale and either a limestone or a sandstone. The exact cause for this phenomenon is not known but it is known that it occurs consistently.

The variation in diameter of a bore hole as a function of the type of strata encountered enables one to determine the dip and strike of the strata, as will now be explained. Thus, if a measuring device is passed through the bore hole to determine the diameter of the bore hole accurately along the length of the bore hole, it is possible to identify changes in the strata through which the bore hole passes. If this same type of measuring device is modified so as to maintain the device in essentially a central position, at all times, and if a plurality of measuring devices arranged in a horizontal plane are used to measure the variation in the distance of the walls of the bore hole from its center, it is possible to determine the inclination of the various strata at particular points in the bore hole.

The simplest illustration of the principle involved can be presented by imagining a measuring device having two profiling arms pivotally attached to the device on opposite sides thereof, the contact points of the profiling arms being in a horizontal plane. As will presently be pointed out, for practical purposes, it is necessary to have at least three profiling arms, but for simplicity of the present explanation two arms are imagined. Now, as the measuring device is lowered or raised in the bore hole, assuming the device to be properly centered in the hole, one profiling arm will move inwardly or outwardly, due to a change in diameter of the bore hole caused by a change in strata, before the other profiling arm will make a similar movement, provided the plane of stratification is inclined and provided the vertical plane in which the two profiling arms lie is perpendicular to the line of strike of the particular stratum. It is then a simple matter to determine the angle of inclination or dip of the particular stratum from the measured vertical distance between the points of contact of each profiling arm with the stratum and the measured diameter of the borehole at these points of contact.

It is apparent from the above that valid measurements can be made only in a case in which the two profiling arms are oriented in a plane perpendicular to the line of strike. Since the direction of strike of underlying strata is one of the unknown pieces of information which it is desired to obtain, it is obvious that an instrument with only two profiling arms would not be practicable unless the instrument were run up and down the hole several times with the profile arms oriented in a different azimuthal direction each time. If however, an instrument is used having three or more profiling arms equally spaced around the circumference of the borehole and having associated therewith means for orienting one of the profiling arms with respect to the compass, sufficient information can be obtained with one traverse of the borehole to enable a computation of both the dip and strike of strata encountered.

In accordance with these principles, therefore, a preferred embodiment of this invention comprises the following components: Three or more uniformly spaced profile measuring devices together with centering and guiding means to maintain the apparatus in substantially the center of a bore hole and to maintain the apparatus in alignment with the bore hole; an orienting device which will determine the azimuthal orientation of the apparatus; and an inclination detector to determine the inclination of the apparatus from the vertical in the event the bore hole is not vertical. This entire apparatus is to be lowered into a bore hole by means of a cable associated with a suitable measuring device to determine the depth of the apparatus in the bore hole. The cable also includes electrical conductors suitably connected to the profile measuring devices, orienting device, and inclination device so as to permit recording on the surface of the earth of all necessary information in order that the dip and strike of strata traversing the bore hole can be accurately determined.

The nature and objects of the invention will be more clearly understood from the ensuing description and from the accompanying drawings which indicate a preferred form of apparatus to be used. It is to be understood, of course, that the embodiment presented is by way of illustration and not of limitation, the apparatus being adaptable to many modifications and refinements within the scope of the invention.

In the drawings, Figs. 1 and 2 diagrammatically illustrate the entire assembled apparatus that is to be lowered into the borehole, Fig. 1 being a vertical view, partly in cross-section of a portion of the apparatus, and Fig. 2 comprising the lower continuation of Fig. 1.

Figure 1:
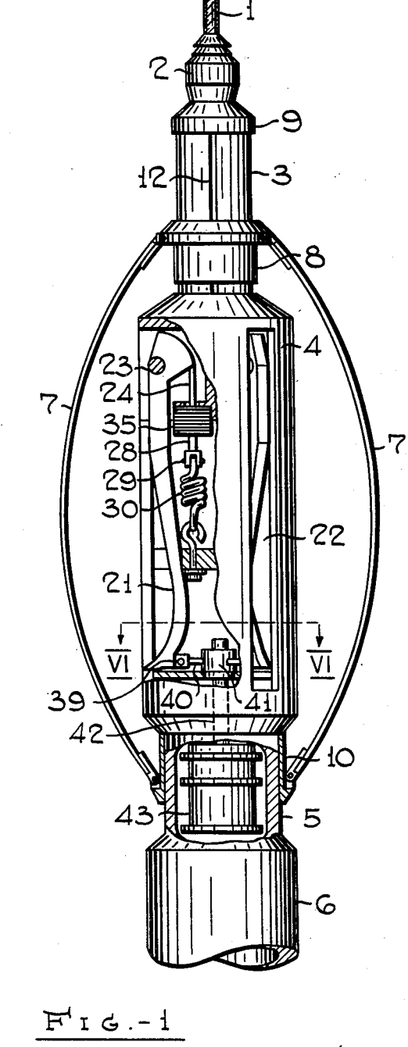
Figure 2:
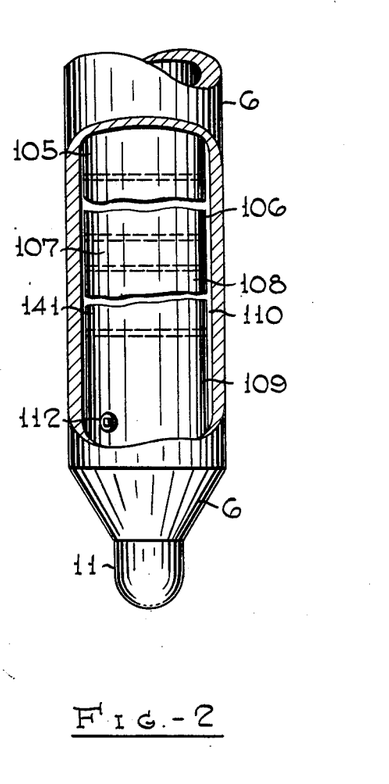
Figures 3, 5, 6:
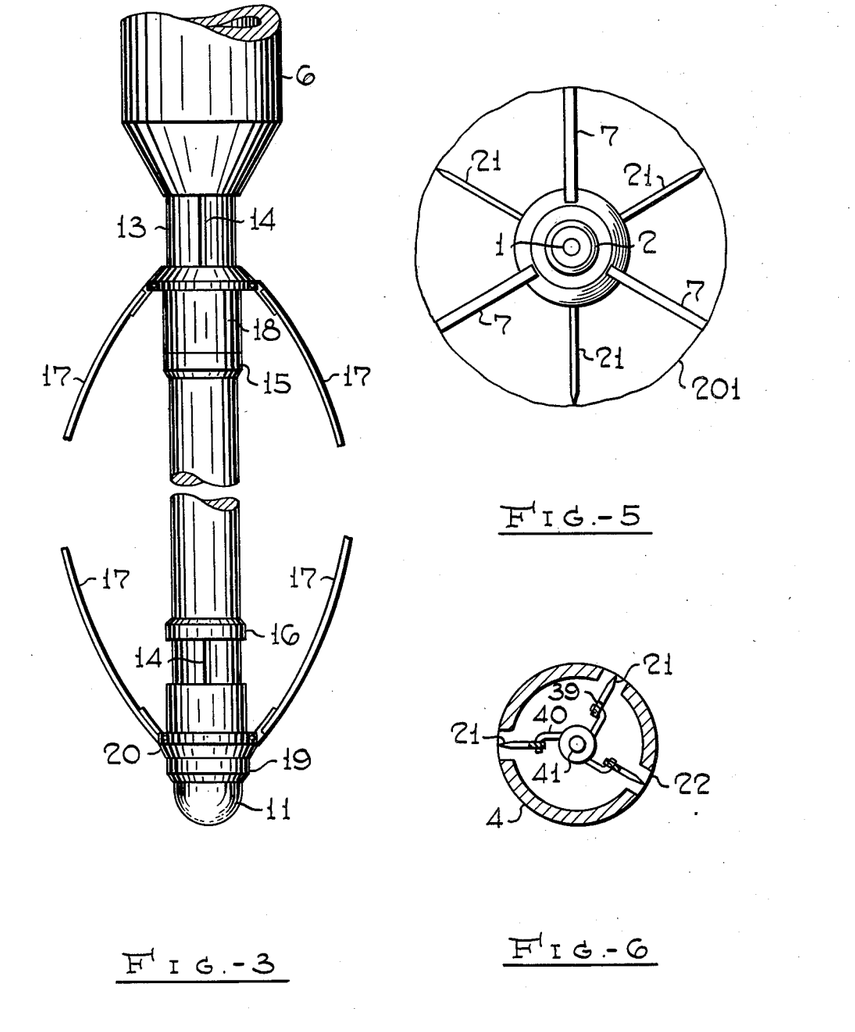
Fig. 3 shows an optional arrangement for the bottom of the apparatus to constitute a lower continuation of Fig. 2.
Fig. 5 is a top plan view of the apparatus as it appears in the bore hole.
Figures 6, 7, and 8 present details of the locking and release mechanism employed for holding the profile arms in place until it is desired to use them in the bore hole, Fig. 6 showing the manner of holding the arms in place, Fig. 7 being a cross-sectional view of the releasing mechanism in locked position and Fig. 8 being a cross-sectional view of the same mechanism in releasing position.

The general nature of the apparatus of this invention is readily ascertained from Figures 1 and 2 which will now be referred to specifically. In these figures, reference numeral 3 designates a shaft to which is attached housing 4 which in turn supports shaft 5 and housing 6. The bottom of housing 6 may terminate in a protective nose plug 11 as shown in Fig. 2 or it may have attached thereto a second shaft 13 having a terminating nose plug 11 as shown in Figure 3. The whole assembly is supported in a well bore my means of cable 1 attached to spearhead 2. Cable 1 also carried electrical conductors for the various instruments contained in housings 4 and 6 as will be described more fully hereinafter. It is preferred that cable 1 be of the type that is provided with a flexible metal sheath so that the sheath and the various metal cases or housings in the apparatus in the bore hole can be used as a return line or ground for the several electrical circuits described further on in the specification.

The apparatus is adapted to be maintained in a central position in the borehole by means of centering leaf springs 7. Although for simplicity of illustration only two of these springs are shown, it is preferred to use three or four such springs for the sake of stability. Springs 7 are pivotally attached at one end to collar 8, which is free to slide on shaft 3, and at the other end to collar 10 which is free to slide on shaft 5. Upward movement of collar 8 is restricted by shoulder 9 and downward movement by case 4. Longitudinal movement of collar 10 is limited by housings 4 and 6. Rotational movement of collars 8 and 10 is prevented by keys which fit into slots 12.

In the embodiment represented by Fig. 2 in conjunction with Fig. 1, the centering of the device is accomplished with the single set of springs 7. In the embodiment represented by Fig. 3 in conjunction with Figs. 1 and 2 a second set of leaf springs 17 is used which are similarly fixed to movable collars 18 and 20. Movement of collars 18 and 20 lengthwise of shaft 13 is limited by case 6 and by shoulders 15, 16, and 19. Rotational movement of collars 18 and 20 is prevented by keys which fit into slots 14. The play in collars 8, 10, 18 and 20 is sufficient to permit springs 7 and 17 respectively to be compressed sufficiently so that the apparatus will pass freely through the smallest diameter expected in the borehole. By providing for the free longitudinal movement of collars 8 and 10 on shaft 3 and of collars 18 and 20 on shaft 5 the possibility of springs 7 or 17 jamming in the borehole when the apparatus is being lowered or raised in the borehole is practically eliminated.

With the above described arrangement for leaf springs 7 and 17 each of the springs in each assembly will be substantially equally compressed or will equally expand upon encountering variations in the diameter of the bore hole, and essentially in the center thereof. The springs 7 and 17 by pressing against the formation also serve to minimize rotation of the apparatus in the bore hole as it is being pulled through the borehole.

Contained within housing 4 are a plurality of profile arms 21, at least three in number and preferably equal in number to the number of leaf springs 7, the profile arms being pivotally attached to the housing at points 23 and thus adapted to swing outwardly through longitudinal slots 22 in housing 4. As shown in greater detail in Fig. 4, the upper end of each arm 21 is arcuate in shape and is provided with a groove 24 ending in a slot 25 which is adapted to receive pin 26 to which is attached one end of wire 27. This wire is connected to armature 28 which is coupled to spring 30 by coupling 29. Spring 30 is anchored to block 32 by means of hook 31, block 32 being fastened to housing 4. It will be seen that this arrangement will cause tension in spring 30 to urge arm 21 outwardly from the housing 4 through slot 22. The outward movement of the profile arms is limited by stop 33 which is adapted to engage shoulder 34.

Figure 4:
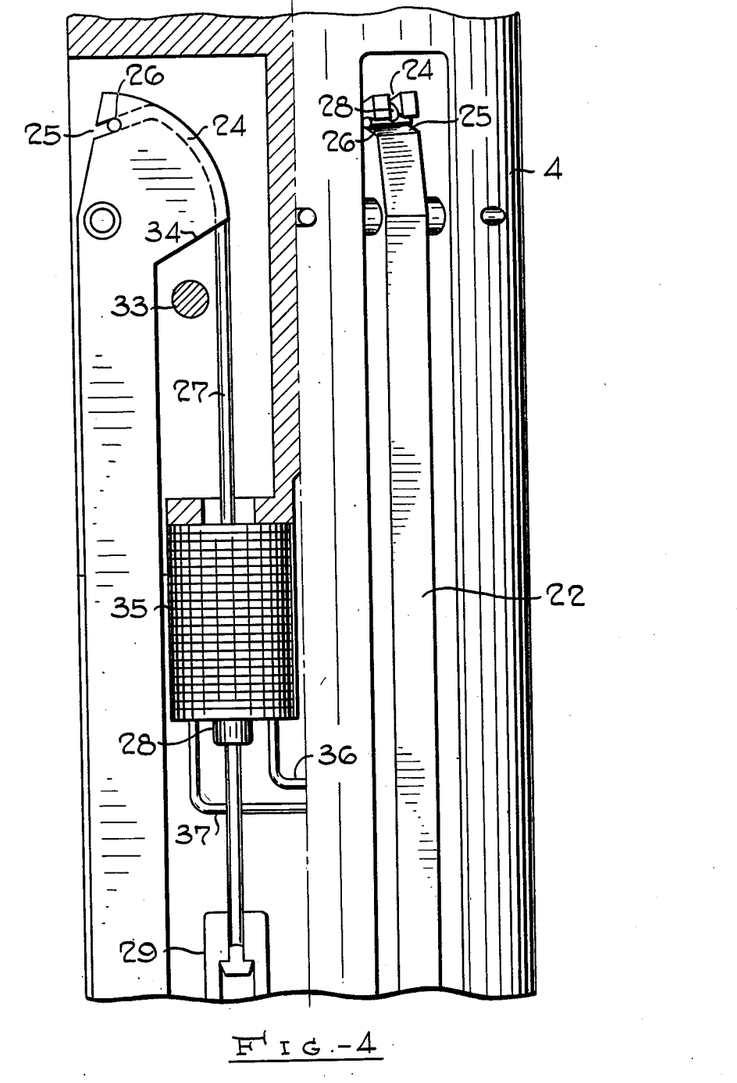
Figure 4 presents details of the profile arm and armature arrangement used in the apparatus for measuring variations in diameter of the bore hole.

It will be seen that any movement of arm 21 will be translated into corresponding movement of armature 28 which in turn will affect the field in coil 35 through which armature 28 passes. Coil 35 is provided with electrical leads 36 and 37 which are connected to a suitable electrical circuit at the earth's surface through cable 1. It is desirable to impregnate coil 35 with a plastic material such as a polybasic acid-polyhydric alcohol resin or a methacrylate polymer to prevent injury thereto by moisture and mud encountered in the hole.

The relative tension of springs 30 compared to that of leaf springs 7 is preferably so selected that the position of the apparatus in the center of the bore hole will not be affected by contact of profile arms 21 with the borehole. For example if only one of the arms 21 should contact an isolated projection of the borehole, the tension in springs 7 against the bore hole would prevent the apparatus from moving out of line as the apparatus traverses the bore hole and as the projection is encountered by the profie arm, thus avoiding the receipt of erroneous signals from the other arms.

It should be noted that the apparatus is so designed that the arms 21 are positioned in the same general part of the apparatus as the centering springs, being located so as to project out between two adjacent springs 7 as shown in Fig. 5 so that the centering springs 7 will not interfere with the contacting of the walls of the bore hole 201 by arms 21. The provision for positioning of the arm so that they will contact the formation at about the same level as the centering springs constitutes an important feature of this invention since it ensures a high degree of accuracy in the measuring of the borehole contour. It is obvious that side sway of the apparatus in the bore hole will have a minimum effect on the movement of the profiling arms.

Turning again to Fig. 1 it will be seen that arms 21 are adapted to be held in slots 22 against outward movement by curved pins 40 set into collar 41 attached to rotatable bar 42 and which engage holes 39 in arms 21. This is shown in detail in Fig. 6. Bar 42 is adapted to be rotated in a counterclockwise direction, as viewed from the lower end, by means of a release mechanism contained in case 43 which is described in more detail in Figs. 7 and 8, Fig. 7 being a vertical cross sectional view of the release mechanism in the locked position and Fig. 8 being a like view of the mechanism in the released position.

Figure 7:
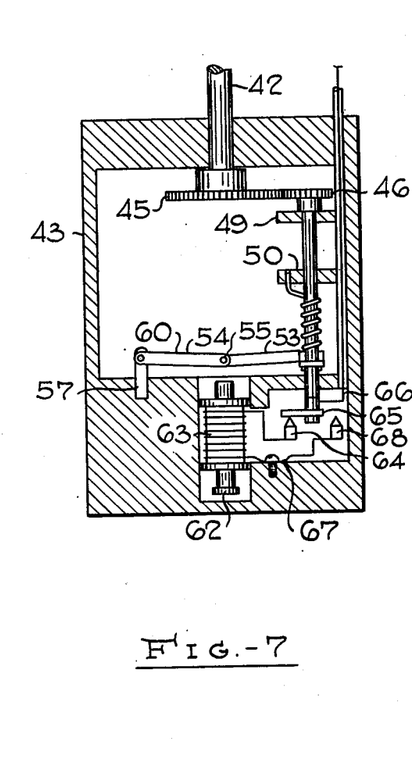
Figure 8:
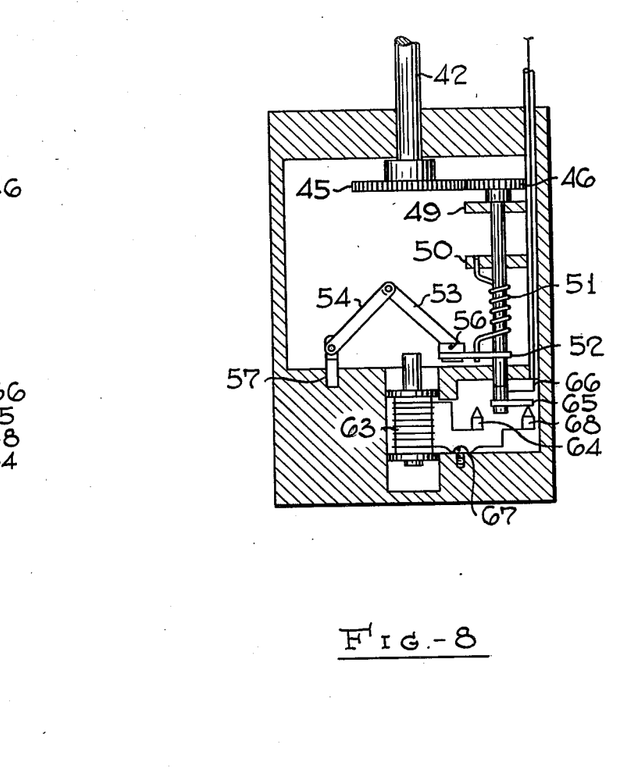

With specific reference to Figs. 7 and 8, rotatable bar 42 is connected to a central gear 45 which meshes with spur gear 46 attached to shaft 47. Shaft 47 will be seen to have its axis arranged vertically and adapted for rotation about journals or bearings 49 and 50 which are attached to case 43. A lever 52 extending at right angles to the axis of shaft 47 is secured to the shaft some distance below journal 50. The upper end of spring 51 is attached to that portion of case 43 forming a support for journal 50 while the lower end of the spring is secured to lever 52; this arrangement of spring 51 exerts a bias on shaft 47 in the clockwise direction when shaft 47 is viewed from its lower end. Attached to the lower end of shaft 47 is switch 65 which is arranged to complete the circuit through coil 63 when the shaft is in the position shown in Fig. 7 and to break the circuit when the shaft has rotated about its axis to the position shown in Fig. 8.

Jointed bar 60 is constructed with arms 53 and 54 secured together by a pin or shaft 55. Arm 53 of jointed bar 60 is secured to lever arm 52 of shaft 47 by pin 56 while arm 54 is secured to the case 43 by pin 57.

The means for actuating the releasing mechanism consists of an armature 62 having a vertical axis and slidably arranged in coil of wire 63. One end of coil 63 is grounded to case 4 by means of screw connector 67 and the other end of the coil is connected to switch point 64. Switch 65 is connected through conductor 66 to one end of one of the coils 35 of Fig. 1, as explained below in greater detail in connection with Fig. 9. In the non-released position of the mechanism, switch 65 contacts switch point 64 and in the released position contacts switch point 68, the latter being grounded to case 4 through connector 67. The spatial placement of contact points 64 and 68 is merely schematic in the drawings, for purposes of simplicity of description, and it is to be understood that each will be so positioned as to contact switch 65 at either one or the other setting of the mechanism as described.

The mechanism may be released from the position shown in Fig. 7 to that of Fig. 8 in the following manner. Upon the sending of a direct current pulse through conductor 66 in a manner described in connection with Fig. 9, the current passes through switch 65 and contact point 64 to coil 63, causing armature 62 to be drawn upwardly so that it strikes the center of bar 60. As the pivot 55 of jointed bar 60 moves above the line joining the end pivots 56 and 57, the bar buckles under the bias exerted by spring 51 and allows shaft 47 to rotate through an angle of approximately 90°. As shaft 47 rotates it operates switch 65 to break the electrical connection through coil 63 and to engage switch 65 with contact point 68 and also rotates gear 46 through an angle of approximately 90° in the clockwise direction as viewed from the lower end of the device. This causes gear 45 to rotate in the opposite direction and thereby rotate bar 42 through a sufficient angle to disengage pins 40 from holes 39 in profile arm 21. The gear ratio between gears 45 and 46 is so selected that the pins 40 will be pulled clear of the profiling arms.

Suitable electrical circuits for releasing the profile arms through the mechanism described in Figs. 6, 7, and 8 and for subsequently measuring movement of the caliper arms 21 are presented schematically in Figs. 9 and 10. In these latter figures coil 35 represents the coil surrounding armature 28 in the apparatus as described, coil 63, switch 65 and contacts 64 and 68 refer to these items as depicted in Figs. 7 and 8 and the balance of the components of the circuits are positioned at the earth's surface, being connected with the components in the apparatus in the borehole through suitable conductors in cable 1. The ground connection in these diagrams represents the return line established through case 4 and the outer sheath of cable 1 as previously described.

Figure 9:
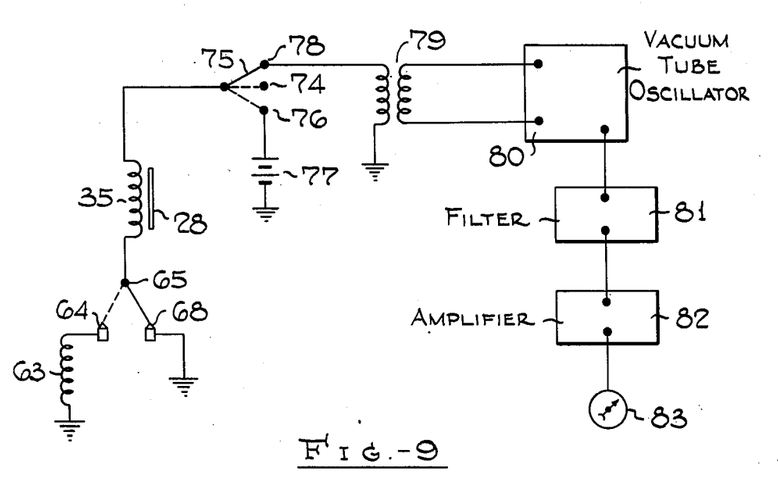
Figures 9 and 10 present electrical circuits suitable for measuring movement of the profile arms shown in Fig. 1.

Referring now specifically to Fig. 9, one end of coil 35 is connected to switch 65 as described previously and the other end is connected through a suitable conductor in cable 1 to switch 75 located at the earth's surface. Switch 75 is adapted to be thrown in three positions, one position 74 making an open circuit and each of the other positions 76 and 78 making a closed circuit. When switch 75 is in position 76 a direct current is sent from battery 77 through coil 35, switch 65 and contact 64 to coil 63 to actuate the release mechanism described in Figs. 7 and 8. Obviously other suitable conductors can also be connected to contact 64 to actuate other mechanisms in the apparatus at the same time through the use of suitable relays. Thus, the release mechanism for a spring wound motor used in some of the devices in the apparatus as described later in the specification can be actuated at the same time as the release mechanism for the profiling arms. The manner of connecting such additional conductors to contact point 64 is so obvious that it is neither necessary to describe it in any detail here nor to complicate Fig. 9 by showing such additional conductors or relays therein. When the release mechanism is actuated switch 65 is thrown over to contact 68 which grounds one side of coil 35. Switch 75 is thrown to position 78 when it is desired to measure the movement of armature 28. With coil 63 cut out of the circuit and switch 75 in position 78 the circuit is ready for the measurement of changes in the field of coil 35 brought about by armature 28. There is now direct contact from coil 35 to transformer 79. It is of course to be understood that provision of a circuit with switches 78 and 65 is necessary only with one of the coils 35, this being done in order to avoid use of an extra conductor for the purpose of actuating the release mechanism of Figs. 7 and 8, and that the other coils 35 can be connected directly to similar transformer 79. As will be seen in connection with Fig. 16 as described later in the specification the conductors associated with the other coils 35 can be made to carry a plurality of signals.

Referring further to Fig. 9, an A. C. current is induced in transformer 79 by means of vacuum tube oscillator 80, causing an A. C. current to flow through coil 35. Any change in the position of armature 28 will vary the impedance of coil 35 and thereby affect the A. C. current flowing through transformer 79. This change can be detected as a change in the D. C. bias on a vacuum tube in oscillator 80, which can be picked up as a D. C. signal which can be fed to a filter 81 to filter out extraneous A. C. transients and then fed into a vacuum tube amplifier 82. The amplified D. C. signal can then be measured by meter 83 which may be an ordinary galvanometer or preferably a recording galvanometer of one of the usual types, i. e., one using a moving pen which will draw a line on a moving roll of paper or one using a moving beam of light to trace a line on sensitized paper or film. Thus any movement of armature 28 will be recorded or observed as a change in meter or recorder 83.

The specific design of vacuum tube oscillator 80, filter 81, amplifier 82 and meter or recorder 83 need not be described in detail here since numerous designs of such components are known to persons skilled in these particular arts and any of the designs can be adapted to the present invention.

Figure 10:
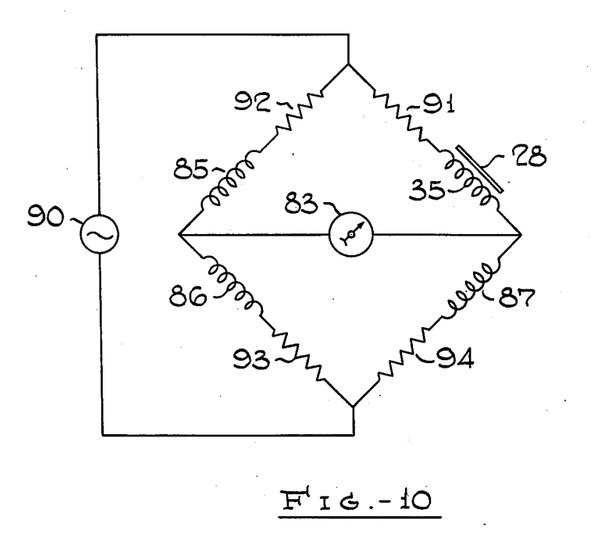

An alternative method for measuring the movement of armature 28 is shown in Fig. 10 which illustrates a conventional bridge circuit which can be used to measure the variation in inductance of coil 35 as the position of armature 28 varies. One arm of the bridge contains coil 35 and resistance 91, and the other arms are composed of inductance coils 85, 86 and 87 and resistances 92, 93 and 94. A source of alternating current 90 is connected across one diagonal of the bridge and a recording galvanometer 83 is connected across the other diagonal. The fluctuations recorded by galvanometer 83 will reflect the movement of armature 28 and hence of the profiling arm with which it is associated. It is of course to be understood that coil 35 and armature 28 are in the instrument placed in the borehole and that the rest of the circuit is maintained at the earth's surface, suitable connections being made through cable 1. It is also to be understood that the conductor associated with one of the coils 35 can be used to actuate the mechanism of Figs. 7 and 8 in the same manner as described in discussing the circuit of Fig. 9.

The portion of the apparatus involving the profiling arms 21 and their associated components having been described, the remaining portions of the apparatus comprising means for determining orientation of the apparatus and its inclination in the borehole will now be discussed. Referring back to Fig. 2 it will be seen that housing 6 contains a compartment 105, an orientation device 106, a second compartment 107, an inclinometer 108, and a motor housing 109. Housing 109 contains a commercially available spring wound motor provided with suitable clockwork, speed governor, electrically operated remote control release mechanism, etc., and has a drive shaft 141 protruding therefrom and extending up to inclinometer 108 and orientation means 106. A channel 110 extends upwardly from motor housing 109 also, for the purpose of carrying the various electrical conductors leading from cable 1 to the motor release for the motor in housing 109, and to the devices 106 and 108 presently to be described. Compartments 105 and 107 are designed for the storage of dry cells for the lights used in devices 106 and 108, collector rings for transferring current from moving parts of the devices to stationary conductors, etc. An opening 112 is provided in housing 109 to permit the winding of the spring motor.

Figure 11:
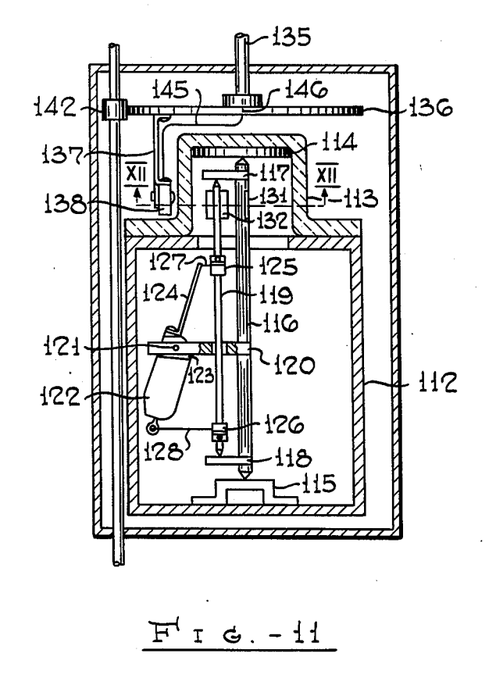
Figures 11 and 12 show a suitable inclinometer for use in the apparatus of Figures 1 and 2, Fig. 11 representing a vertical view of the inclinometer, partly in cross section, and Fig. 12 showing a cross sectional top view of a portion of Fig. 9.
Figure 12:
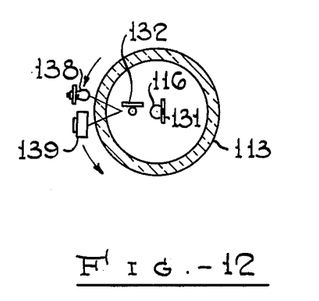

Details of inclinometer 108 are shown in Figs. 11 and 12 which will now be referred to specifically. Figure 11 is a vertical view of the device, partly in cross section, and Figure 12 is a cross-sectional top view along line XII—XII of Figure 11. The inclinometer device described herein is disclosed and claimed in copending application Serial No. 72,515 of Alexander B. Hildebrandt, filed January 24, 1949. Alternatively, the inclinometer described and claimed in U. S. Patent 2,365,999 of Frank G. Boucher, issued December 26, 1944, can readily be adapted for use in the present invention.

Inclinometer 108 comprises a pendulum chamber 112 having mounted therein a transparent cover 113. This cover may be constructed of shock-resistant glass or of any transparent plastic material having a softening point above the temperature to be encountered in the well.

Fitted within the top of the cover 113 is a bearing plate 114 which is preferably constructed of metal. At the bottom of chamber 112 and disposed in vertical relation to bearing plate 114 is bearing support 115, the bearings in plate 114 and support 115 being adapted to support between them rotatable shaft 116. Near the extremities of shaft 116 are brackets 117 and 118 having bearings adapted to receive rotatable shaft 119. Attached to shaft 119 at points intermediate its ends are spools 125 and 126. Intermediate ends of shaft 116 and fastened thereto is pendulum bracket 120 provided with an opening through which shaft 119 may pass. Pivotally supported on bracket 120 at fulcrum point 121 is pendulum 122 having a shoulder 123 which is adapted to rest against the underside of pendulum bracket 120 when the inclinometer unit is in a vertical position.

Extending upwardly from pendulum 122 is arm 124 to the upper end of which is attached a flexible line such as a cord or wire 127 which is adapted to wind around spool 125. A second cord or wire 128 is fastened to the lower end of pendulum 122 and is adapted to wind around spool 126. Wires 127 and 128 are wound in opposite directions around spools 125 and 126 respectively so that as one wire is wound onto its respective spool the other wire will unwind from its spool. Thus, as pendulum 122 moves on its fulcrum it will cause shaft 119 to rotate.

Attached to the upper end of shaft 116 in a vertical position is mirror 131. A similar mirror 132 is attached vertically to the upper end of shaft 119. Mirrors 131 and 132 are set at a known angle to each other when the apparatus is in a vertical position. This angle may be 90° for example.

It will be seen that the entire assembly encased within chamber 112 and transparent cover 113 is adapted to swing freely on shaft 116 so that pendulum 122 will seek the lowest position as the unit is inclined. It will also be seen that as the unit is inclined from the vertical, pendulum 122 will swing outwardly on its bracket 121 and thereby rotate mirror 132 through some angle with respect to mirror 131.

Suitably supported above cover 113 is a shaft 135 to the lower end of which is fastened geared wheel 136. Suspended from wheel 136 is a bracket 137 to which are fastened a source of light 138 and a light-sensitive cell 139, each of these elements being supported close to the exterior of transparent cover 113, and in such relation to each other that at some definite position of each of the mirrors 131 and 132 light from light source 138 will be reflected into light-sensitive cell 139. Meshing with geared wheel 136 is a pinion gear 142 which is fastened to shaft 141 which is adapted to be driven by spring motor 109. Cell 139 may be a photoelectric cell or a selenium resistance cell or any other suitable cell for detecting light or changes in light intensity. Shaft 141 extends upwardly to operate orientation device 106 in synchronism with the inclinometer.

In operation, shaft 141 is driven by constant speed power source 108 and in turn causes wheel 136 to rotate at a constant speed and thus move light source 138 and light-sensitive cell 139 around the circumference of transparent cover 113. As the two mirrors 131 and 132 intercept a light beam as depicted in Fig. 12 a pulse is generated in the light-sensitive cell 139 which pulse when recorded at the surface will show the relative position of mirror 131 with respect to mirror 132. By using device 106 for orientating the inclinometer unit with respect to the points of the compass the direction of inclination of the apparatus can be readily determined.

The specific embodiment of the invention shown in Fig. 11 represents a preferred construction of the inclinometer unit in that it provides a fluid tight chamber which may be filled with oil or similar viscous liquid to damp the movement of pendulum 122 on its fulcrum as well as the swinging of the pendulum on shaft 116. In this embodiment it is obvious that at least that portion of chamber 112, adjacent to the mirrors must be transparent in order to allow light to enter from the light source 138 and be reflected back into cell 139. Thus, at least the sides of cover 113 must be of transparent material. The entire chamber could also be constructed of the same transparent material if desired although from a practical standpoint it is preferable to have the major portion made of metal in order to impart sufficient mechanical strength to the unit.

In an embodiment wherein fluid damping is not considered necessary it is obvious that the special construction shown in Fig. 11 would not be needed and light source 138 and sensitive cell 139 could be housed within the same enclosure as the other elements of the inclinometer. However, for most satisfactory operation the type of construction illustrated by Fig. 11 is preferred wherein the motion of the pendulum can be damped with a suitable fluid.

Conventional means can be used for supplying electric current to light source 138 and for conducting electric impulses from light sensitive cell 139 to a recording device at the surface. For example cable 145, provided with sufficient conductors, is connected to light source 138 and sensitive cell 139 and is led through opening 146 in shaft 135 which is hollow. Contained within compartment 107 are the usual slip rings and sliding contacts to transfer current from rotating cable 145 to nonrotating conductors in the conventional manner. Conveniently, current for light source 138 can be obtained from dry cells in compartment 107, while electrical impulses from cell 139 can be transmitted to equipment on the earth's surface by suitable conductors in cable 1.

As slip ring arrangements and dry cell brackets are well known and as it involves merely a matter of design on the part of a person skilled in the art to locate these items in compartment 107 specific description of these components is omitted here, to avoid unnecessary detail. Likewise, it is a simple matter to place in compartment 107 a suitable relay for connecting light source 138 with those dry cells, the relay being actuated by the same impulse that is used to actuate the release mechanism of Figs. 7 and 8 as described in conjunction with the electrical circuit of Fig. 9, thus conserving the energy in the dry cells until actual profiling has begun. Such relays can conveniently be connected to switch point 64 of Fig. 9, although, as previously mentioned, additional conductors for such relays have been omitted from Fig. 9 to avoid undue complication of the drawing. The methods of recording impulses from sensitive cell 139 and of determining the inclination of the instrument from the recorded impulses are discussed further on in the specification in connection with Figs. 15, 16 and 17.

Figure 13:
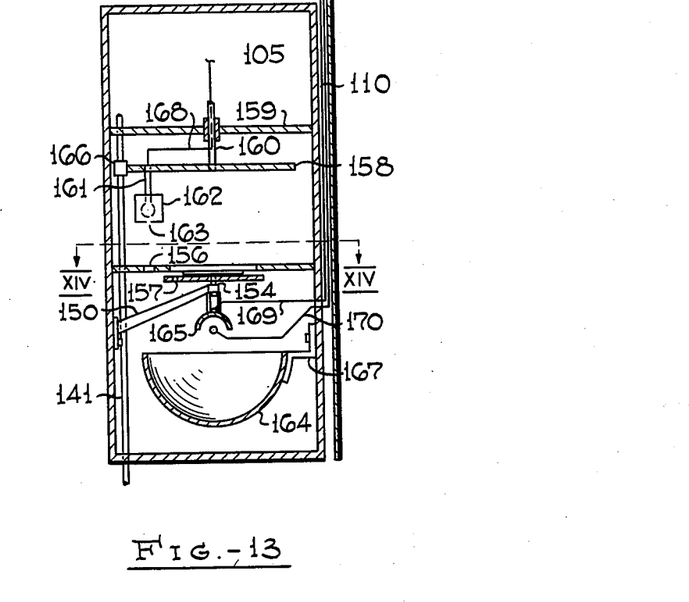
Figures 13 and 14 present vertical and plan views of a suitable orientation device for the apparatus.
Figure 14:
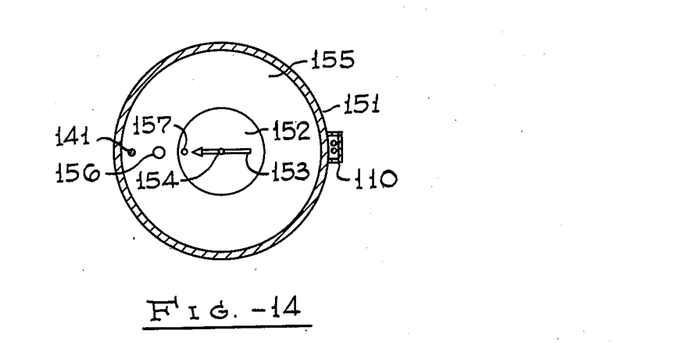

Reference is now made to Figures 13 and 14 which illustrate a suitable orientation detector 106. The detector has a shell or case 151, of a non-magnetic material such as brass, having mounted therein a circular member 152, to which is attached bar magnet 153. A pivot 154 extends through member 152 and is supported by a suitable bracket 150. An annulus 155 has its periphery secured to case 151 and is arranged so that the circle defined by its inner circumference is slightly above and inside of the periphery of member 152. Member 155 is provided with an opening 156 and member 152 is provided with a similar but smaller opening 157. Opening 156 is preferably in alignment with pivot point 154 and one of the profile arms 21 in housing 4. It will be apparent that the arrangement just described is generally similar to a marine compass, with opening 156 corresponding to the lubber's line on such a compass, and opening 157 corresponding to the north point of the compass.

Some distance above member 152 a geared wheel 158 is secured to bracket 159 with shaft 160 of the wheel aligned with the pivot 154 of member 152. A bracket 161 is secured to wheel 158 and carried thereby is light source 162 having an aperture 163 of such size that a beam of light will pass through openings 156 and 157 during some part of the rotation of wheel 158. Wheel 158 is caused to rotate by means of pinion gear 166 mounted on drive shaft 141 which extends up from spring motor 109. It is thus possible to synchronize the rotation of light source 162 of the orientation device with rotation of light source 138 of the inclinometer and thus facilitate the correlation of the degree of inclination of the apparatus with its orientation.

Placed below members 152 and 155 and attached to bracket 167 is a suitably curved mirror 164 which is adapted to reflect light passing through openings 156 and 157 to a centrally disposed light-sensitive device 165 which may be supported from bracket 150. Device 165 may be a photoelectric cell or a selenium resistance cell or any other suitable cell for detecting light or changes in light intensity. Impulses from device 165 are transmitted through suitable conductors 169 and 170 which are led up through channel 110 to cable 1 and thence to a recording galvanometer in the surface equipment. Current for light source 162 is fed through conductors 168 leading down through hollow shaft 160, the current being transferred to conductors 168 through a slip ring arrangement from dry cells placed in compartment 105 in a manner similar to that described in connection with inclinometer 108.

In determining orientation by means of this device, power is supplied to wheel 158 from drive shaft 141, and in turn, wheel 158 rotates light source 162 at a constant rate. Every time light 162 passes above opening 156 a ray of light will be passed through this opening and will be reflected to light-sensitive means 165. In like manner the passage of light 162 above opening 157 will cause a ray of light to be momentarily transmitted to the light-sensitive means 165. When openings 156 and 157 lie on a common radius, the light from source 162 will be transmitted through openings 156 and 157 simultaneously, but any angular movement of member 152, with respect to case 151, will cause a separation of openings 156 and 157, with a resulting interval between the time the light passes through opening 156 and through opening 157. In other words, if the openings 156 and 157 are arranged so that the light will pass through the two openings simultaneously when magnet 152 points to the magnetic north, any deviation of the case 151 from this orientation will be indicated by the angular separation of openings 156 and 157. It will be apparent that in order for the orientation detector to operate properly case 6 and the associated inclination detector 108 should preferably be composed of non-magnetic material. Similarly any conductor passing through case 6 should be shielded.

Figure 15:
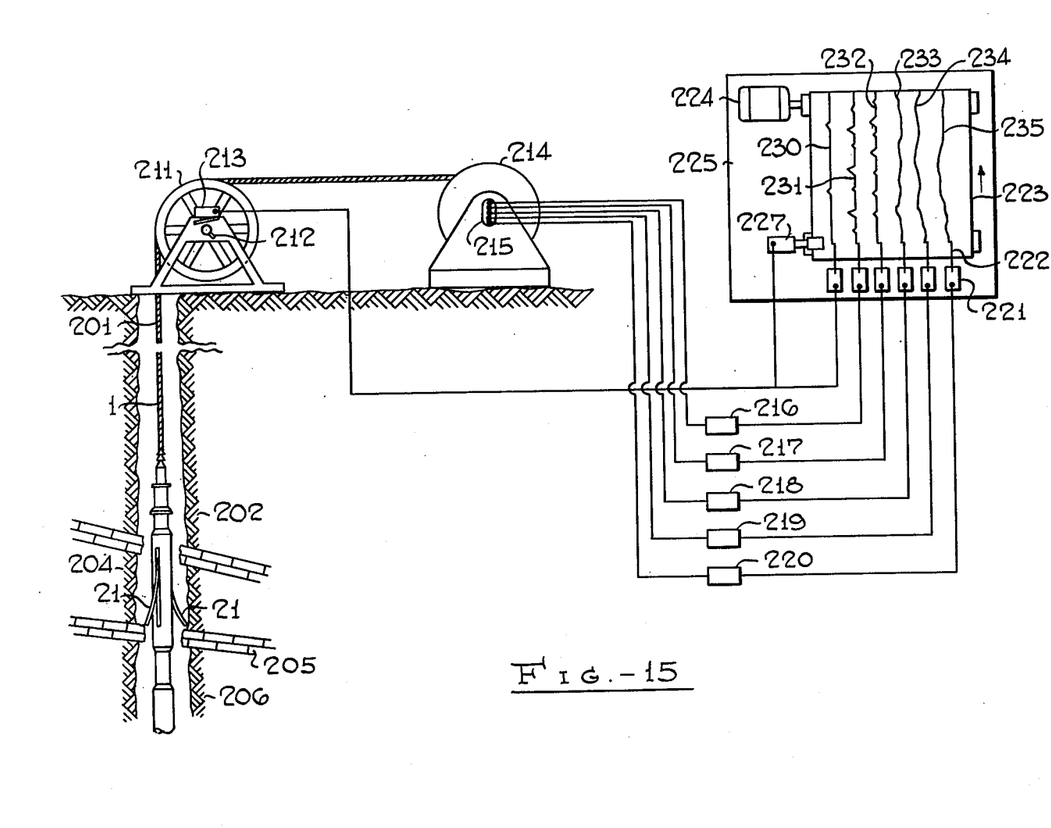
Figure 15 depicts the apparatus of the invention in place of a bore hole, together with surface equipment, showing how the dip and strike of strata are actually measured.
Figure 16:
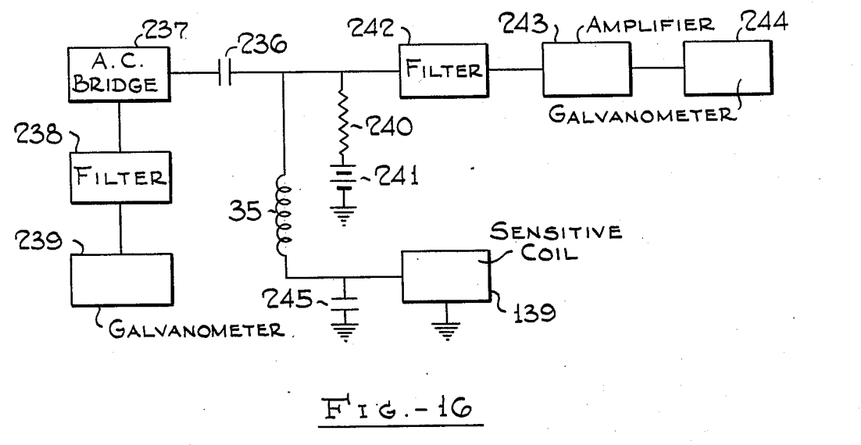
Figure 16 is a schematic diagram of a suitable electrical circuit for utilizing the same conductors to carry two sets of signals from the apparatus in the bore hole to equipment at the surface.
Figure 17:
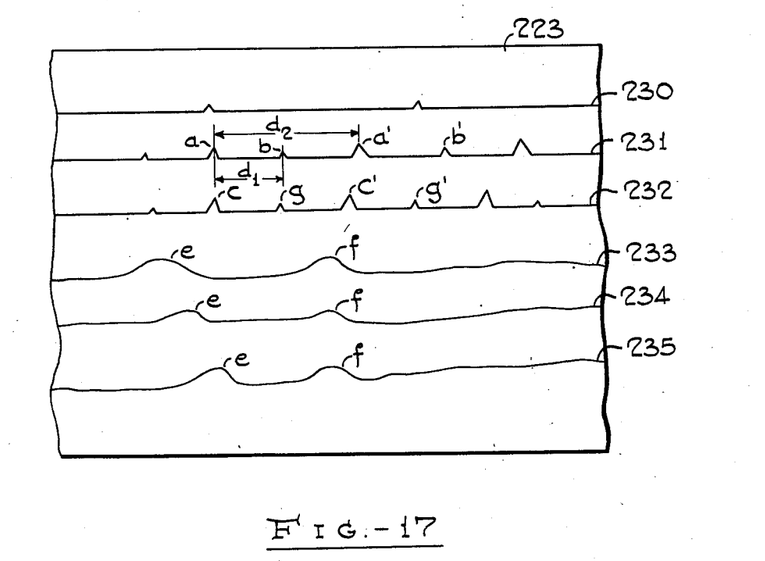
Figure 17 shows the type of record obtained with the various measuring devices constituting the apparatus of the present invention.

The method of utilizing the assembled apparatus of this invention, comprising the profiling arms with their measuring means, the inclinometer and the orientation means is illustrated in Fig. 15 and 16 and in Fig. 17 is depicted the type of chart obtained with the various measuring devices of the assembled apparatus.

With specific reference to Fig. 15 the apparatus of the invention is shown in place in a bore hole 201. It will be seen that the diameter of the hole varies with the difference in type of strata encountered. Thus strata 203 and 205 being more resistant to erosion than strata 202, 204, and 206, cause a reduced cross section of the bore hole. The difference in cross section encountered as the apparatus of the invention is raised through the bore hole will be detected by the relative movement of the profiling arms 21. If a stratum dips from the horizontal the various profiling arms will not encounter the projections simultaneously but will encounter them in a sequence which depends on the dip of the stratum. In Fig. 15 the apparatus is supported on cable 1 in bore hole 201, cable 1 being pulled over measuring wheel 211. For convenience of illustration centering springs 7 of Fig. 1 are not shown in Fig. 15. The measuring wheel may be of a convenient diameter so that an integral number of feet of cable, say 5 to 10 feet will pass over it for one rotation of the wheel. Affixed to wheel 211 or to its axle is a pin 212 which is so placed that on each rotation of wheel 211 the pin will actuate switch or relay 213. Cable 1, carrying a sufficient number of electrical conductors to service the various measuring devices in the apparatus, is wound onto reel 214 which is provided with slip rings and sliding contacts contained in box 215 to establish contact between the ends of the conductors in cable 1 and recording instrument 225. Recorder 225 has a plurality of galvanometers 221 each provided with recording means 222 for producing traces on moving paper 223 which is fed through the instrument by motor 224. Motor 224 may be either a constant speed motor or it may be a selsyn type motor tied in with the rotation of measuring wheel 211 so that paper 223 will be fed at a rate proportional to the rate of travel of the apparatus in the bore hole. One of the galvanometers 221 is connected to relay 213 and serves to record each rotation of wheel 211 as an aid to determining the depth of the apparatus at any particular point on the record. A mechanical counting device may be made an integral part of switch or relay 213 or, alternatively, relay 123 may be made to actuate a separate counting device to indicate the depth of the apparatus in the hole. As an added refinement, switch or relay 213 can also be made to actuate a numbering stamp 227, adapted to record the depth in feet directly on record paper 223.

In the schematic diagram of Fig. 15, impulses received from the inclinometer unit of Figs. 11 and 12 are fed into amplifier 216 and then to one of the galvanometers 221 to record trace 231. Similarly, impulses from the orientation instrument of Figs. 13 and 14 pass through amplifier 217 and one of the galvanometers 221 to give record trace 232. The impulses from arms 21 pass through appropriate measuring circuits 218, 219, and 220 and are recorded as traces 233, 234 and 235. Circuits 218, 219 and 220 may be of the types described in connection with Figs. 9 and 10.

If desired the number of conductors required in cable 1 can be limited to three by using one of them to carry signals from one of the profiling arms and from the inclinometer unit and another to carry signals from another of the profile arms and from the orientation device. The third can be used for the various tripping circuits, to release the profiling arms, start the spring motor, etc. as described in connection with Fig. 9. A suitable circuit for carrying two sets of signals is shown schematically in Fig. 16, the circuit being connected to one of the coils 35 of Fig. 4 and to sensitive cell 139 of Figs. 11 and 12. Obviously a similar circuit can be used involving sensitive cell 165 of Figs. 13 and 14. The ground connection in every instance represents the return line through the metal case and the shield of cable 1 as previously described. One terminal of coil 35 is grounded through condenser 245 and is also connected to sensitive cell 139. The other terminal of coil 35 is connected through condenser 236 to an A. C. bridge in the manner described in conjunction with Fig. 10, and is also connected to a battery 241 through surge resistor 240 and to filter 242. Variations in light received by cell 139 causes its resistance to vary and thus vary the D. C. potential fed to filter 242. Filter 242 filters out any A. C. signals received from the bridge circuit 237 and coil 35. The filtered signal is fed to amplifier 243 and then to recording galvanometer 244. The varying A. C. signal from coil 35 which is picked up as a change in the balance of bridge 237 is passed through filter 238 to recording galvanometer 239. It is, of course, understood that galvanometers 239 and 244 are equivalent to two of the galvanometers 221 of Fig. 15. The purpose of filter 238, which is a narrow band pass filter, is to eliminate any signals that might have been picked up from the other coils 35. To eliminate or minimize feedover, different frequencies are fed to each of the coils 35. For example, frequencies of 300, 400, and 500 cycles may be chosen for the three circuits. Thus if the circuit illustrated employs a 500 cycle per second A. C. current, filter 238 will be designed to pass only this frequency.

It can be seen from the foregoing detailed description that the manner in which the apparatus of this invention is to be used involves lowering the apparatus into a bore hole, actuating the various release mechanisms to start the spring motor, release the profiling arms, close the various light switches, etc., and then raising the apparatus up the hole while recording traces of the impulses received from the profiling arms, the inclinometer and the orientation device while simultaneously recording the depth of the apparatus in the hole. The manner of interpreting the record obtained in order to determine the dip and strike of various strata encountered will be apparent from the ensuing description in connection with Fig. 17.

In Fig. 17 is diagrammatically indicated a typical record obtainable with the well logger of this invention. The record shown may be produced on a strip of paper showing the fluctuations of galvanometers controlled by the profile arms, orientation device, and inclinometer. In addition to these records, a record is made of the depth of the apparatus in the bore hole, the markings produced being represented by line 230. The notches of this line appear periodically to indicate distances on the record paper corresponding to a given distance in the well. For example, a notch will appear each ten feet the apparatus travels up the bore hole.

The line 232 on this record represents the type of trace produced by the orientation detector described. The passage of light through the opening 156 of the detector is shown by the kicks designated by letter $c$. Similarly the passage of light through the opening 157 is shown by kicks $d$. Since the larger opening 156 allows a greater amount of light to pass than opening 157, the kick produced by passage of light through opening 156 may be readily distinguished. It will be recalled that if the kicks $c$ and $d$ coincided, it would indicate that opening 156 was directly north of the center of the apparatus. However, since the kicks $c$ fall approximately midway between the kicks $d$, it is apparent that opening 156 is almost due south of the center of the case. An actual record can, of course, be examined accurately to obtain the precise bearing. Assuming, which is the proposed case, that one of the three profiling arms is aligned with the opening 156 and the center of the case, the exact orientation of this arm is now known. Similarly the position of each of the other arms is also known. For example, if the three arms are symmetrically placed around their supporting case, then it will be known that one arm, as indicated above, is pointed due south and that the other arms are pointed 120 degrees in each direction away from south.

Trace 231 depicts a representative trace recording when operating the inclinometer of Figs. 11 and 12. On this trace the kicks designated by reference $a$, $a'$, etc., indicate the pulses picked up by reflection from mirror 131 and the kicks designated by reference $b$, $b'$, etc., represent pulses picked up from mirror 132. In the case in which the paper is fed through the recording instrument at a uniform speed the kicks $a$ will be spaced at a uniform distance from each other, inasmuch as light source 138 and sensitive cell 139 revolve at a uniform speed. Also the distance measured on the paper from kick $a$ to kick $b$ will be directly proportional to the angular relationship between mirror 131 and mirror 132.

To measure the angle of inclination of the instrument in the borehole it is merely necessary to ascertain the distance on the paper from kick $a$ to kick $a'$, and from kick $a$ to kick $b$ and then apply the ratio of these two differences in the following equation:

$$\alpha = 2A\frac{d_1}{d_2} - \frac{A}{2}$$

Assume that the instrument is set so that, as the pendulum moves through an angle of A degrees, mirror 132 rotates through an angle of 180 degrees; also assume that mirror 132 is set at an angle of 90 degrees from mirror 131 when the pendulum is in a vertical position or in its normal position with the shoulder 123 resting against bracket 120. Then let $d_1$ equal the distance between kick $a$ and kick $b$ on the trace paper of Fig. 17 and let $d_2$ equal the distance between kick $a$ and kick $a'$. If we let A equal the angle of swing of the pendulum from the vertical for 180 degrees of rotation of mirror 132 then the distance $d_2$ will be equivalent to the swing of the pendulum through an angle equal to 2A. Now if α equals the angle of inclination to be measured then it is obvious that $$\alpha = 2A\frac{d_1}{d_2} - \frac{A}{2}$$

If this instrument is set so that the pendulum in swinging 20 degrees will cause the mirror 132 to rotate through an angle of 180 degrees, i. e., if A equals 20 degrees then in the above equation:

$$\alpha = 40\frac{d_1}{d_2} - 10$$

Ordinarily there should be no difficulty in determining which kicks on the traced record are those received from mirror 131 and which are those received from mirror 132 for, when a constant film or paper speed is employed, the traces a, a', etc., will normally be equidistant except while the pendulum 122 is swinging about on shaft 116. However, it may be desirable to have the kicks from one mirror be of larger amplitude than those from the other mirror, as shown in trace 231. This can be accomplished conveniently by providing a film of filtering material on one mirror so that it will not reflect as much light as the other mirror. Another method of distinguishing reflections from the two mirrors, and one that will usually work satisfactorily, is merely to have one mirror larger in area than the other mirror. With mirrors of suitable size more light will be reflected from the larger mirror than from the smaller which will cause a larger impulse to be generated in light sensitive cell 139.

In order to facilitate correlation of the indicated orientation of the apparatus with its indicated inclination it is desirable to have light source 138 of the inclinometer aligned with light source 162 of the orientation device and to provide for the rotation of the two light sources at the same rate of speed. It is then a simple matter to line up the direction of the inclination of the apparatus with respect to the compass.

Having now established from the record of Fig. 17, the depth of the apparatus, the orientation of the profiling arms, and the inclination of the apparatus, it remains only to interpret the records of the profiling arms indicated by traces 233, 234, and 235. These lines represent a profile of the bore hole traced by each of the three arms. It will be noted on the record that two erosion resistant strata are indicated. Because of the sequence in which the profiling arms touched the strata, it appears that the uppermost stratum indicated by waves e is slightly inclined, while the stratum indicated by waves f is in essentially the same plane as the three arms. It must be remembered, of course that the inclination of the case must be accounted for in determining the actual incline of each stratum so that the stratum indicated by traces f is not necessarily horizontal but lies in the plane through the profiling arms determined by the inclination of the apparatus at the depth indicated.

For an accurate determination of the dip and strike of strata from a record such as that shown, the following principles may be employed. It is generally most convenient to neglect the inclination of the apparatus for the moment and to find the dip of each stratum with the assumption that the apparatus is vertical. When this has been done, by rotating the established plane in accordance with the inclination of the apparatus, the actual orientation of the particular stratum may be found. In carrying this out, the vertical distance between contact of each profile arm with a particular stratum may be found by referring to the depth markings shown by trace 230. The distance of each arm from the center of the case may be found provided the record has been calibrated to show this. Thus vertical reference lines may be drawn on the record adjacent to the actual line drawn by the recording means of the galvanometer associated with each profile arm to show the actual extension of the arm. By also knowing the orientation of each arm as formerly described, the position of the stratum may be computed. The procedure need not be further described since it merely involves ordinary mathematical geometric analysis.

As described, therefore, the present invention comprises a method and apparatus for obtaining the dip and strike of strata adjacent a bore hole. The procedure entails lowering a properly centered and aligned measuring apparatus down a bore hole, said apparatus having means for obtaining at least three profiles of the bore hole at equally spaced positions about its circumference and for obtaining the azimuthal orientation and the inclination of the apparatus while profiling. More specifically the apparatus comprises a body adapted to be lowered into a bore hole on a cable carrying a plurality of electrical conductors, at least three profiling arms pivotally attached to the body at equally spaced points around a horizontal circumference thereof, at least three flat elongate curved springs slidably fastened to the body above and below the profiling arms and so placed as to not interfere with contacting of the walls of the bore hole by the profiling arms and yet ensuring that the body will be centered in the bore hole in the region where the arms contact the bore hole, means for urging the profiling arms outwardly to contact the walls of the bore hole, electrical means associated with each of the arms to detect individual movement of the arm with respect to the body, such as an electric coil and an armature adapted to move within the coil in relation to movement of the profiling arm with which it is associated, an orientation device adapted to produce changes or impulses in an electrical circuit which are indicative of the position of the body or of one of the profiling arms with respect to one of the points of the compass, an inclination device which is adapted to produce changes or impulses in an electrical circuit which are indicative of the inclination of the body from a vertical line, electrical circuits connected through the conductors in the cable with the orientation device, the inclination device and the electrical means associated with each profiling arm, and devices located at the earth's surface to record simultaneously the changes or impulses effected in each of the electrical circuits.

Preferably, the device which is to be lowered into the bore hole also contains a releasable clamping means for holding the profiling arms in against the body and remotely controllable releasing means for the clamping means so that the device may be lowered into the hole with the arms held in clamped position and then by means of an electrical impulse released for contact with the walls of the bore hole when it is desired to raise the device up through the bore hole and make the aforementioned record. The information obtained on the record enables determination of the exact path or orientation of the bore hole in the earth, the relative resistance of strata adjacent the bore hole to erosion, and the dip and strike of strata adjacent the bore hole. All of this information may be obtained with a high degree of precision by means of the method and apparatus described.

An important feature of the invention involves positioning of the profiling arms in the same general part of the apparatus as one set of centering springs. This will cause these arms to contact the formation at about the same level as the centering springs and thus insure a high degree of accuracy in measuring the contour of the bore hole.

As the present invention is capable of many embodiments, modifications, and substitution of equivalents it is to be understood that the invention is not to be restricted to the specific embodiments presented, which are by way of illustration and not of limitation. The invention is to be limited only to the following claims.

What is claimed is:

1. An apparatus for logging a bore hole comprising a body adapted to be raised and lowered in the bore hole, a first set of centering springs supported by said body and a second set of centering springs supported by said body in spaced relation to said first set of centering springs lengthwise of said body whereby said body is at all times maintained in the center of and aligned with said bore hole, a set of at least three profiling arms movably held by said body and arranged symmetrically about a horizontal circumference thereof in a manner placing said arms into contact with the walls of the bore hole at essentially the same level as one of said sets of centering springs, means urging each of said arms into independent contact with the walls of the bore hole, means for continuously measuring the distance from the centerline of said body to the point of contact of each of said arms with the walls of the borehole, a device within said body for continuously measuring the azimuthal position of a reference point on the body, a device within said body for continuously measuring inclination of the body from the vertical, means at the earth's surface adapted to record indicia for determining the measurements made by said azimuth measuring device, said inclination measuring device and said distance measuring means, and electrical circuits connecting each of said measuring means with said recording means.

2. An apparatus as defined by claim 1 in which said profiling arms are elongate arms each pivotally attached at one end to said body and in which said apparatus includes releasable clamps holding said arms in against said body in opposition to said means urging the arms into contact with the walls of the bore hole and a remotely operable release for releasing said clamps.

3. An apparatus as defined by claim 1 in which each set of centering springs comprises at least three flat elongate curved spring members and fasteners holding each of said spring members to said body, at least one of said fasteners comprising a collar fixed against rotational movement about said body but adapted for free limited slidable movement along said body.

4. Apparatus according to claim 1 in which said azimuth measuring device comprises a rotating scanning mechanism adapted to effect periodic changes in an electrical circuit indicative of the position of a reference point on a horizontal circumference of said body with respect to the position of a compass within said body and in which said inclination measuring device comprises a rotating scanning mechanism adapted to effect periodic changes in an electrical circuit indicative of the inclination of said body from a vertical line, the rotation of said first named and second named scanning mechanisms being synchronized, whereby correlation of the degree of inclination of the body with azimuthal orientation is facilitated.

FRANK G. BOUCHER.

References Cited in the file of this patent

UNITED STATES PATENTS

| Number | Name | Date |
|---|---|---|
| 1,980,100 | Schlumberger | Nov. 6, 1934 |
| 2,153,329 | Jutson | Apr. 4, 1939 |
| 2,170,527 | Culbertson | Aug. 22, 1939 |
| 2,176,169 | Doll | Oct. 17, 1939 |
| 2,235,533 | Roberts | Mar. 18, 1941 |
| 2,281,960 | Vacquier | May 5, 1942 |
| 2,317,632 | Miller | Apr. 27, 1943 |
| 2,322,343 | Brandon | June 22, 1943 |
| 2,322,634 | Howell | June 22, 1943 |
| 2,332,777 | Boucher | Oct. 26, 1943 |
| 2,340,987 | Robidoux | Feb. 8, 1944 |
| 2,365,999 | Boucher | Dec. 26, 1944 |
| 2,396,935 | Walstrom | Mar. 19, 1946 |
| 2,398,562 | Russell | Apr. 6, 1946 |
| 2,415,636 | Johnson | Feb. 11, 1947 |
| 2,427,950 | Doll | Sept. 23, 1947 |
| 2,502,775 | Brandon | Apr. 4, 1950 |